United States Patent
Valentine et al.

(10) Patent No.: US 6,487,209 B1
(45) Date of Patent: Nov. 26, 2002

(54) SYSTEM AND METHOD FOR SUPPORTING DTMF TONE SENDING IN AN IP BASED GSM NETWORK

(75) Inventors: Eric Valentine, Plano, TX (US); Lee Davidson, McKinney, TX (US); Heino Hameleers, Kerkrade (NL)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/268,476

(22) Filed: Mar. 16, 1999

(51) Int. Cl.[7] ............................................. H04M 11/00
(52) U.S. Cl. ...................... 370/401; 370/466; 370/467
(58) Field of Search ................................ 370/401, 349, 370/466, 467, 525, 331, 347; 379/221, 219, 220.01, 221.01, 221.15, 900; 455/74.1, 465, 424, 414, 422

(56) References Cited

U.S. PATENT DOCUMENTS

| | | | | |
|---|---|---|---|---|
| 5,737,331 A | * | 4/1998 | Hoppal et al. | 370/349 |
| 5,884,148 A | * | 3/1999 | Bilgic et al. | 455/74.1 |
| 5,987,102 A | * | 11/1999 | Elliott et al. | 379/93.17 |
| 6,006,189 A | * | 12/1999 | Strawczynski et al. | 704/270 |
| 6,097,817 A | * | 8/2000 | Bilgic et al. | 455/422 |
| 6,212,173 B1 | * | 4/2001 | Lindsay et al. | 370/331 |
| 6,301,242 B1 | * | 10/2001 | Lindsay et al. | 370/347 |

FOREIGN PATENT DOCUMENTS

| | | | |
|---|---|---|---|
| EP | 0 859 500 A2 | 8/1998 | |
| GB | 0 781 062 A2 | * 6/1997 | ............ H04Q/7/22 |
| GB | 2 308 529 A | 6/1997 | |
| WO | WO97/16916 | 5/1997 | |
| WO | WO97/23078 | 6/1997 | |
| WO | WO97/50262 | 12/1997 | |
| WO | WO98/28885 | 7/1998 | |
| WO | WO99/35865 | 7/1999 | |

OTHER PUBLICATIONS

ETSI GSM Technical Specification GSM 03.14 "Digital cellular telecommunications system; Support of Dual Tone Multi–Frequency signaling (DTMF) via the GSM system (GSM 03.14)", Version 5.0.0, Nov. 1996.*

* cited by examiner

*Primary Examiner*—Salvatore Cangialosi

(57) ABSTRACT

The present invention provides a system and method for reliably transferring Dual Tone Multiple Frequency (DTMF) signals originating at a MS through an IP based GSM network. In general, when a MS sends a DTMF request, it is processed in the IP network by a logical application module in a MSC, which, based on the disclosed processing, activates another logical application module in an appropriate gateway (for independent, remote, tone generation), and then the logical application module in the gateway directs the production of the DTMF signal towards the interworking or destination network.

25 Claims, 4 Drawing Sheets

SYSTEM AND METHOD FOR SUPPORTING DTMF TONE SENDING IN AN IP BASED GSM NETWORK

TECHNICAL FIELD

The invention relates generally to telecommunications and more particularly to a system and method of sending Dual Tone Multiple Frequency (DTMF) tones through a Global System for Mobile Communications (GSM) network having an Internet Protocol (IP) based backbone transport network.

BACKGROUND OF THE INVENTION

Dual Tone Multiple Frequency (DTMF) tones are used to allow a telephone network user to, for example, interact with voice mail systems, to perform electronic banking, or to direct the functioning of an Advanced Intelligence Network (AIN) service. Traditionally, in a Public Switched Telephone Network (PSTN), DTMF tones are generated by the terminal (hand set). However, in GSM, if DTMF tones were transmitted from a Mobile Station (MS) handset, the DTMF signals would be mutilated by the GSM voice transcoder, and could not pass recognizably through the network. Thus, for a MS in a GSM network to send DTMF tones, a tone generation request message (rather than the actual tone) is sent from the MS to a Mobile Switching Center (MSC). The tones are then typically generated by the MSC and sent to a destination device.

Networks utilizing Internet Protocols (IP) are readily available, offer defined system interface protocols, and have the ability to reliably transmit voice data. IP-based transport networks may also simultaneously support the transport of other data types, such as Internet traffic or voice over IP (VoIP) traffic for wireline networks. IP transport networks typically have lower capital costs, lower recurring costs, and lower tariffs than traditional circuit-switched networks. Accordingly, IP networks may soon be used as a communications backbone suitable for providing a platform to carry GSM network traffic, thus providing the same functionality as a circuit-switched network at lower cost. The benefits provided by the IP network, however, comes at a cost.

Since the voice data is being carried through an IP network, the circuit-switched devices in the MSC are no longer operable. Therefore, the MSC cannot directly insert DTMF tones on request from the MS. Therefore, there does not exist a reliable system or method of transferring a DTMF tone through an IP based GSM network. Therefore, there exists the need for a system and method of sending DTMF tones reliably through a GSM based telecommunications network that uses an IP network as a backbone.

SUMMARY OF THE INVENTION

The present invention provides a system and method for reliably transferring DTMF tones through an IP based GSM network. In general, when a MS sends a DTMF request (typically a DTAP message called "Start DTMF"), it is processed in the IP network by an MSC. The MSC activates an internal software module and an appropriate gateway (for independent, remote, tone generation), and then a processor in the gateway directs the production of the DTMF signal towards the destination network or MS.

According to one aspect of the present invention, provided is a system for sending DTMF tones through an IP based GSM network. The system generally comprises a mobile switching center having a first logical application module which receives a Direct Transfer Application Part (DTAP) message and converts the DTAP message into a Device Control Message (DCM). The system also contains a gateway coupled to the mobile switching center and the IP transport network, and which has a second logical application module that directs the generation of the tone.

The system may provide the capacity for the first logical application module to process the DTAP message and send a corresponding device control message to the second logical application module. In addition, the second logical application module may send a failure message to the first logical application module when tone generation is not possible to attempt or the attempt fails (e.g. congestion in tone-generating equipment). The second logical application module may also select the tone generation method and direct the creation and routing of the tone to the interworking or destination communication system. The gateway of the system may be in communication with a PSTN, an IP network, or another MS.

The method of supporting DTMF tone sending in an IP based GSM network utilizes the steps of receiving a DTAP command from a GSM MS, converting the DTAP command at the MSC into a device control message to the gateway, instructing a tone generator to generate a tone, and sending the tone to the interworking communication system. The interworking communication system utilized in this method could be a PSTN or other circuit-switched network.

Likewise, another method of supporting DTMF tone sending in a IP based GSM network utilizes the steps of receiving a DTAP command from a GSM MS, converting the DTAP command at the MSC into a device control message to the gateway, and selecting a tone generator method compatible with the interworking IP network. The tone generator method could comprise the steps of ordering a tone generator to generate a tone delivered as voice payload to the interworking IP network. The voice payload may be in the form of UDP, RTP, or other standard IP-based payload format, in accordance with the voice payload format of the interworking IP network. Alternatively, the tone generator method could comprise the step of converting the device control message to an IP telephony control message that is routed to the interworking IP network's control node (e.g. an H.323 Gatekeeper) for this call.

Alternatively, another method of supporting DTMF tone sending in an IP based GSM network could comprise the steps of receiving a DTAP command from a GSM MS, converting the DTAP command at the MSC into a device control message to the gateway, ordering a tone generator to generate a DTMF tone, and delivering the DTMF tone from the tone generator to a destination GSM MS.

BRIEF DESCRIPTION OF THE DRAWINGS

Other aspects of the invention, including specific embodiments, are understood by reference to the following detailed description taken in conjunction with the drawings in which.

References in the detailed description correspond to like references in the figures unless otherwise indicated.

DETAILED DESCRIPTION OF PREFERRED EMBODIMENTS

Figure 1:
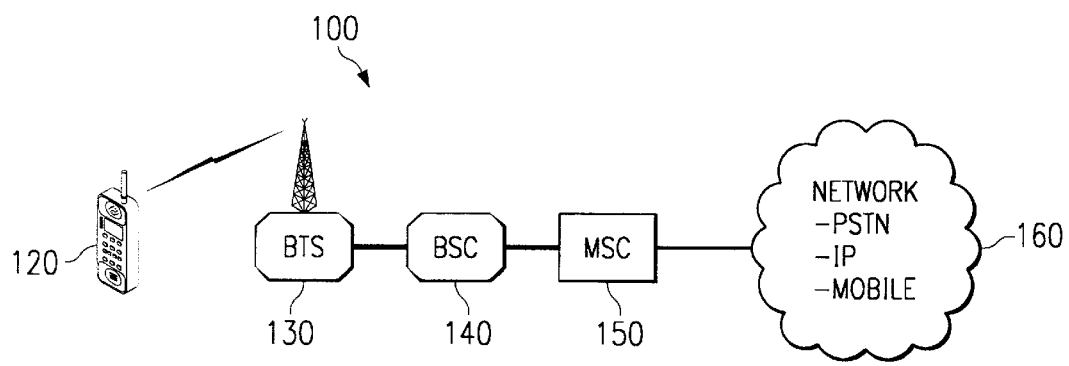
FIG. 1 shows a prior art GSM configuration.

FIG. 1 shows a prior art GSM network denoted generally as 100. Within the network 100, a MS 120 communicates with a Base-station Transceiver Substation (BTS) 130 via radio communications (illustrated in FIG. 1 and other Figures as a lightning bolt). The BTS 130 then communicates with a Base Station Controller (BSC) 140. The BSC 140 then routes the communications between the BTS 130 and a Mobile Switching Center (MSC) 150. Although only one BTS 130 is shown, in a typical GSM network, a plurality of BTSs are connected to a BSC. Likewise, a plurality of BSCs are typically attached to a MSC 150. The MSC 150 may then be connected to a standard GSM circuit switched network backbone which carries calls from the MS 120 to a destination device through a destination network 160, (which may be a PSTN, an IP, or a PLMN (Public Land Mobile Network).

In a prior art GSM network, DTMF tone sending is not done directly by a MS. This is because a DTMF tone, if sent by a MS, would be mutilated by the transcoding processor. Because they are mutilated by the voice transcoder, the tones would not then be recognizable by an application that needs to interpret them.

Instead, when a user of the MS 120 attempts to send a tone from the MS 120, instead of the tone being sent from the MS 120 to the BTS 130, a Direct Transfer Application Part (DTAP) message, "Start DTMF", is sent from the MS 120 to the BTS 130. The Start DTMF message routes through the BSC 140, and then to the MSC 150. The MSC 150 then connects an appropriate internal tone sending device and instructs the tone sending device to insert a tone into the speech path towards the network 160. If the MSC 150 detects that the tone sending was successful, the fact that the tone sending was successful is reported to the MS 120 with a "Start DTMF Acknowledge" message. If the tone generation fails, the failure is reported to the MS 120 using a "Start DTMF Reject" message.

Figure 2:
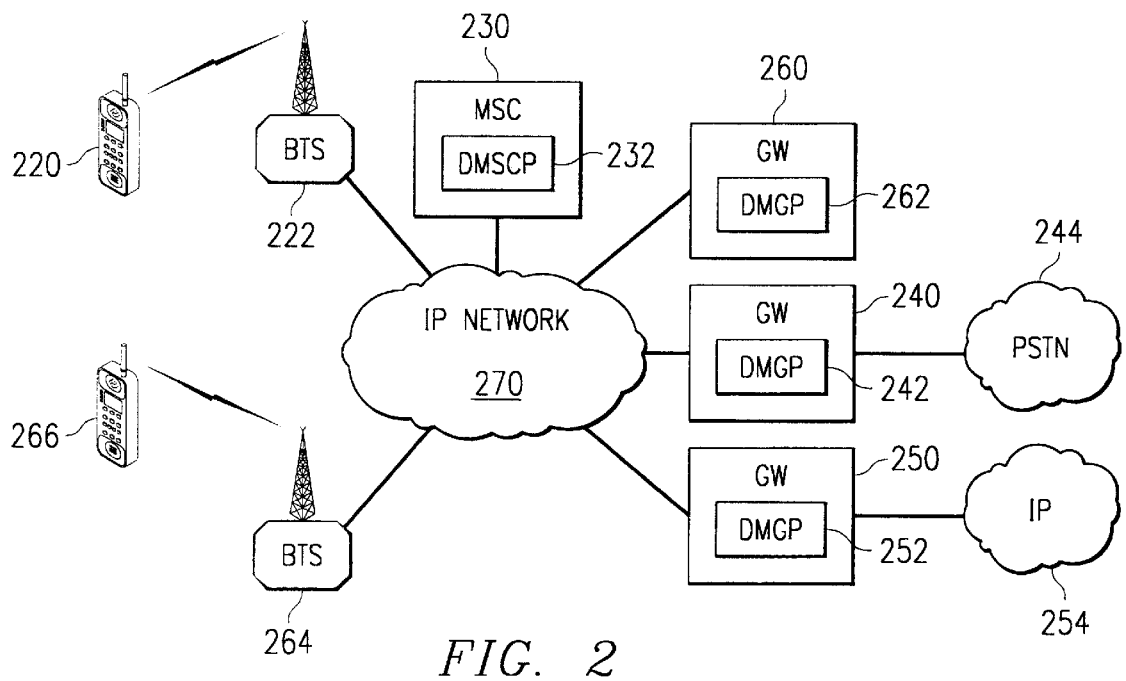
FIG. 2 illustrates a GSM network having an Internet Protocol (IP) network for its backbone.

FIG. 2 illustrates a GSM network having an IP network 270 for its backbone. MS 220 is in communication with BTS 222 that is wire connected to an IP network 270. MS 220 may communicate with a variety of destination networks. Accordingly, another mobile station 266 is shown in radio communication with another BTS 264 that is wire coupled to the IP network 270. In addition, MSC 230 having a DTMF MSC processor (DMSCP) 232 therein is in communication with the IP network 270.

Also attached to the IP network 270 is a Gateway (GW) 260 having therein a DTMF Media Gateway Processor (DMGP) 262 for directing tone generation and signal evaluations. Another GW 240 is coupled between the IP network 270 and a PSTN 244, the GW 240 having therein a DMGP 242 for directing the routing of a tone to the PSTN 244 and for evaluating whether or not the tone was successfully sent. Furthermore, the system of the present invention comprises a GW 250 coupled between the IP network 270 and an Internet Protocol based Network 254, the GW 250 having therein a DMGP for directing the generation of a tone into the IP network 254 and for evaluating signal sending success. Thus, from FIG. 2, it can be seen that the present invention can be used to route a tone originating from a mobile station through an IP based network backbone, and then send the tone to, for example, a PSTN, an IP, or another MS.

CASE ONE

Figure 3:
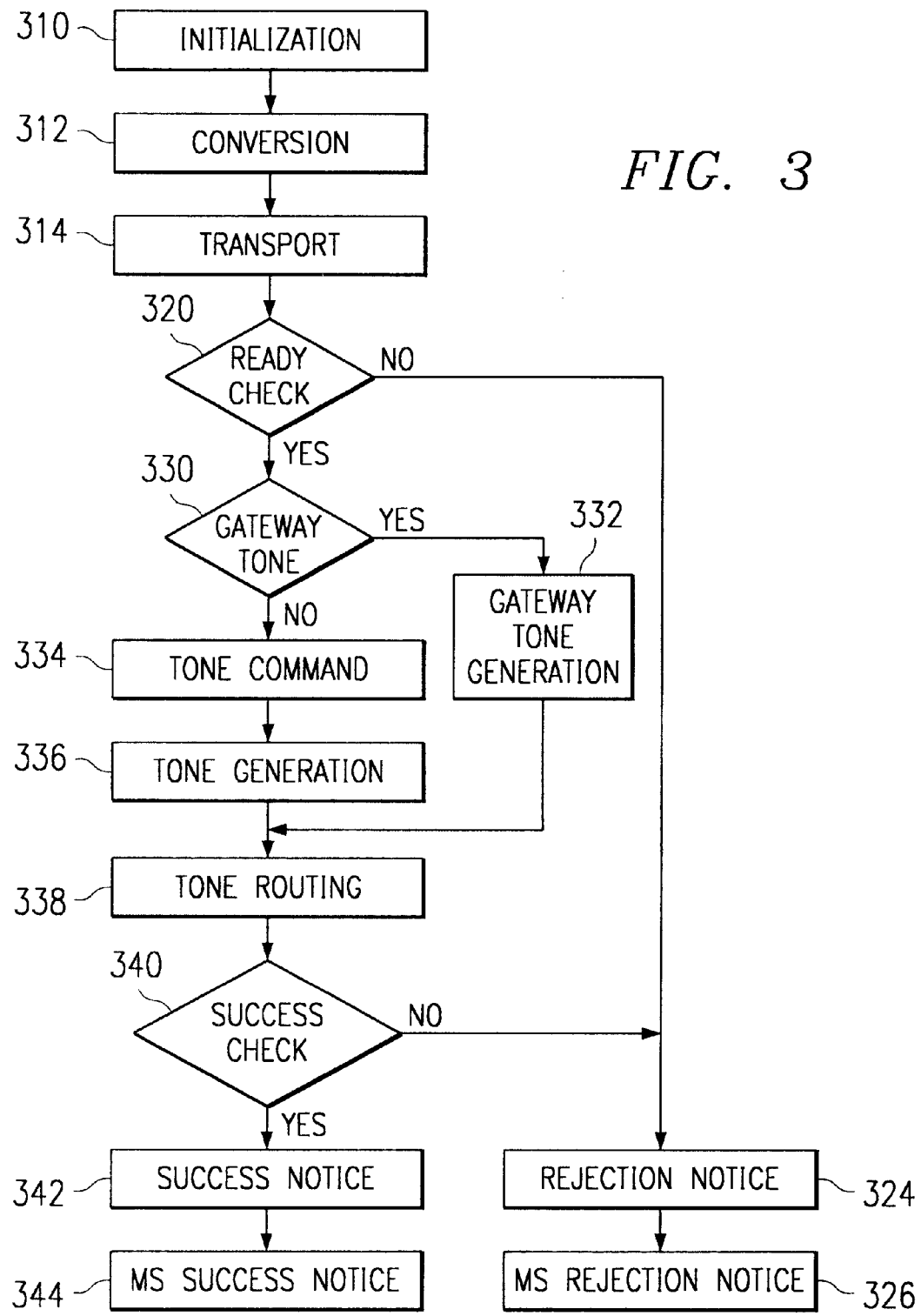
FIG. 3 is a flow diagram showing the steps for communicating a DTMF tone from a mobile station in a GSM network having an IP backbone to a PSTN.

FIG. 3 is a flow diagram that shows the steps for communicating a DTMF tone from a MS 220 to a PSTN 244 in a GSM network having an IP backbone 270. In an initialization, step 310, the MS 220 sends a "Start DTMF" message to the Logical Application Module (LAM) known as the DTMF MSC Processor (DMSCP) 232, which resides in the MSC 230. Next, through a conversion, step 312, the DMSCP 232 processes the start DTMF into a device control message, which is then transported to a LAM called a DTMF Media Gateway Processor (DMGP) 242 (the DMGP 242 is stored and executed in the GW 240) in step 314.

Next, the DMGP 242 checks to determine if the generating device (not shown) is available in a ready check, step 320. If the device is not ready or able to send a DTMF tone, the DMGP 242 sends a notice to the MSC 230 of the failure in a rejection notice, step 324. To report the failure to the MS, the DMSCP 232 then sends a "Start DTMF Reject" notice to the MS 220 in a MS rejection notice, step 326.

If the DMGP 242 is ready, in an appropriate state, and has available tone resources, then the DMGP 242 directs the tone generation. How the tone is generated depends on the devices available for tone generation, which are analyzed in a gateway tone, step 330. In this case, if the GW 240 can generate a tone, then the GW 240 generates the tone in a GW tone generation device, step 332. Then, the tone is routed to the appropriate destination device in a tone routing, step 338. If the GW 240 cannot generate a tone, then the DMGP 242 commands a tone generation device, such as another GW 260, to generate the tone in a tone command, step 334. In a tone generation, step 336, the tone generation device produces the tone. The tone routing is then directed by the DMGP 242 in a tone routing step 338.

Following the tone routing, step 338, the DMGP 242 detects whether or not the tone was sent in a success check, step 340. If the tone generation is unsuccessful the DMGP 242 sends a rejection notice to MSC 230 in a rejection notice, step 324. Next, the DMSCP 232 sends a "Start DTMF Reject" notice to the MS 220 to report the failure in a MS rejection notice, step 326. If the tone generation is successful the DMGP 242 notifies the DMSCP 232 of the successful tone transmission in a success notice, step 342. Then, the DMSCP 232 notifies the MS 220 of the tone generation by sending a "Start DTMF Acknowledge" message in a MS success notice, step 344.

CASE TWO

Figure 4:
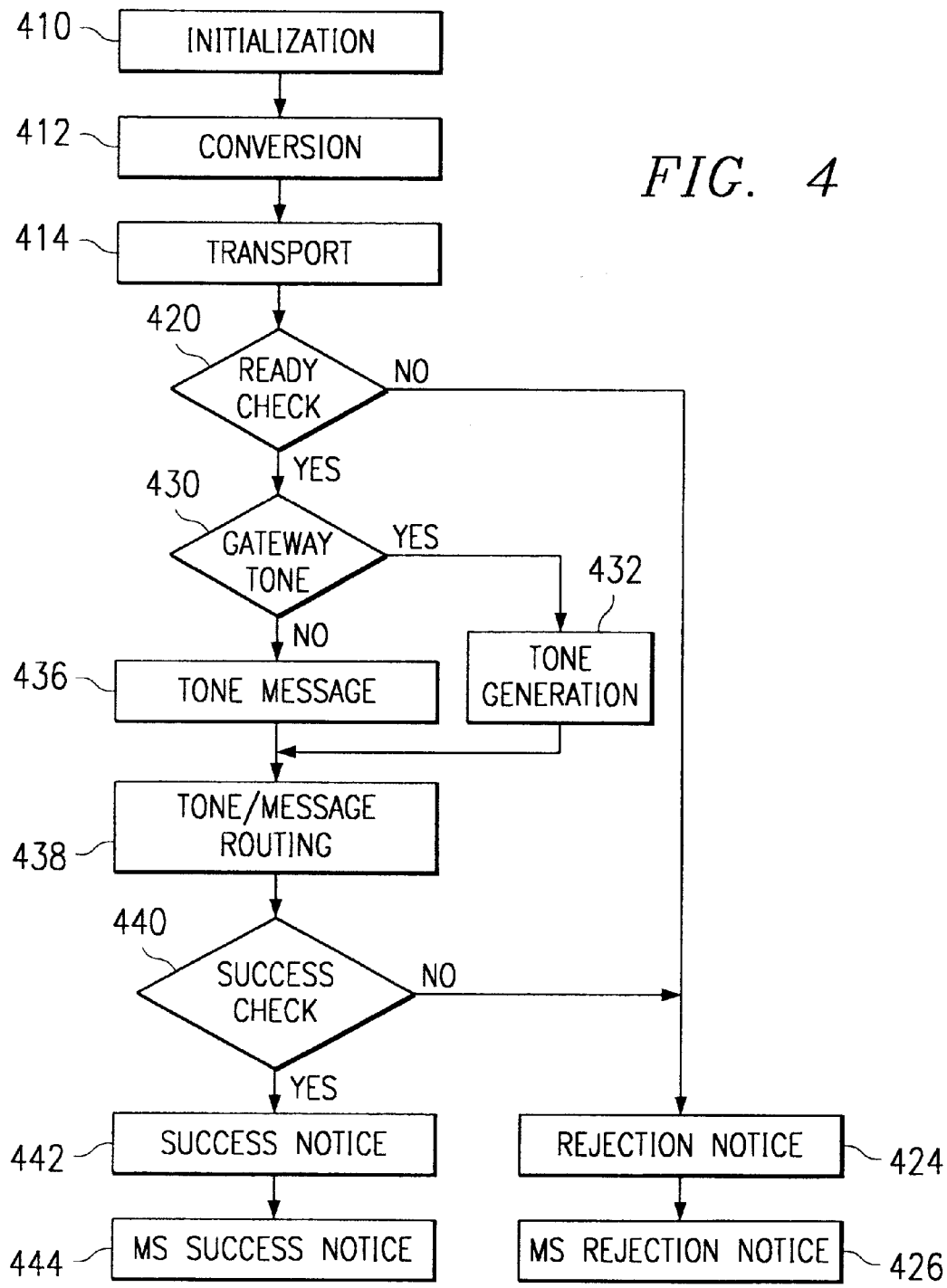
FIG. 4 provides a block flow diagram illustrating the steps for communicating a DTMF tone from a mobile station in a GSM network having an IP backbone to an IP based network.

FIG. 4 provides a block flow diagram illustrating the steps for communicating a DTMF tone from a MS 220 to an IP based network 254 through a GSM network having an IP backbone 270. In an initialization, step 410, the MS 220 sends a "Start DTMF" message to the logical application module DMSCP 232 in the MSC 230. Next, through the conversion, step 412, the DMSCP 232 processes the start DTMF into a device control message, which is transported to a LAM, DMGP 252, in the GW 252 in step 414.

The DMGP 252 then checks to determine if the generating device (not shown) is available in a ready check, step 420. If the device is not ready or able to send a DTMF tone, the DMGP 252 sends a rejection notice to the MSC 230 in a rejection notice, step 424. The DMSCP 232 then sends a "Start DTMF Reject" notice to the MS 220 to report the transmission failure in a MS rejection notice, step 426.

If the DMGP 252 senses that the generating device can send a DTMF tone, then the DMGP 252 directs the tone generation, depending on available tone generation techniques, which are analyzed in the gateway, step 430. If the GW 250 shall generate a tone directly, as in Case One, the GW generates the tone in a GW tone generation, step 432, which places UDP, RTP, or other IP-format data packets into the IP network data stream. The tone is then routed to the appropriate destination device in a tone/message routing step, step 438. If the GW 250 shall not generate a tone, but shall send a tone request message, then the DMGP 252 composes the request message toward the destination network, step 436. The routing of the message is accomplished in the tone/message routing, step 438.

Following the tone/message routing, step 438, the DMGP 252 detects whether or not the tone/message was sent, in a success check, step 440. If the tone generation fails, the DMGP 252 sends a rejection notice to MSC 230 in a rejection notice, step 424. Next, the DMSCP 232 sends a "Start DTMF Reject" notice to the MS 220 to report the failure in a MS rejection notice, step 426. If the tone generation is successful, the DMGP 252 notifies the DMSCP 232 of the tone in a success notice, step 442. Then, the DMSCP 232 notifies the MS 220 of the tone generation by sending a "Start DTMF Acknowledge" message in a MS success notice, step 444.

CASE THREE

Figure 5:
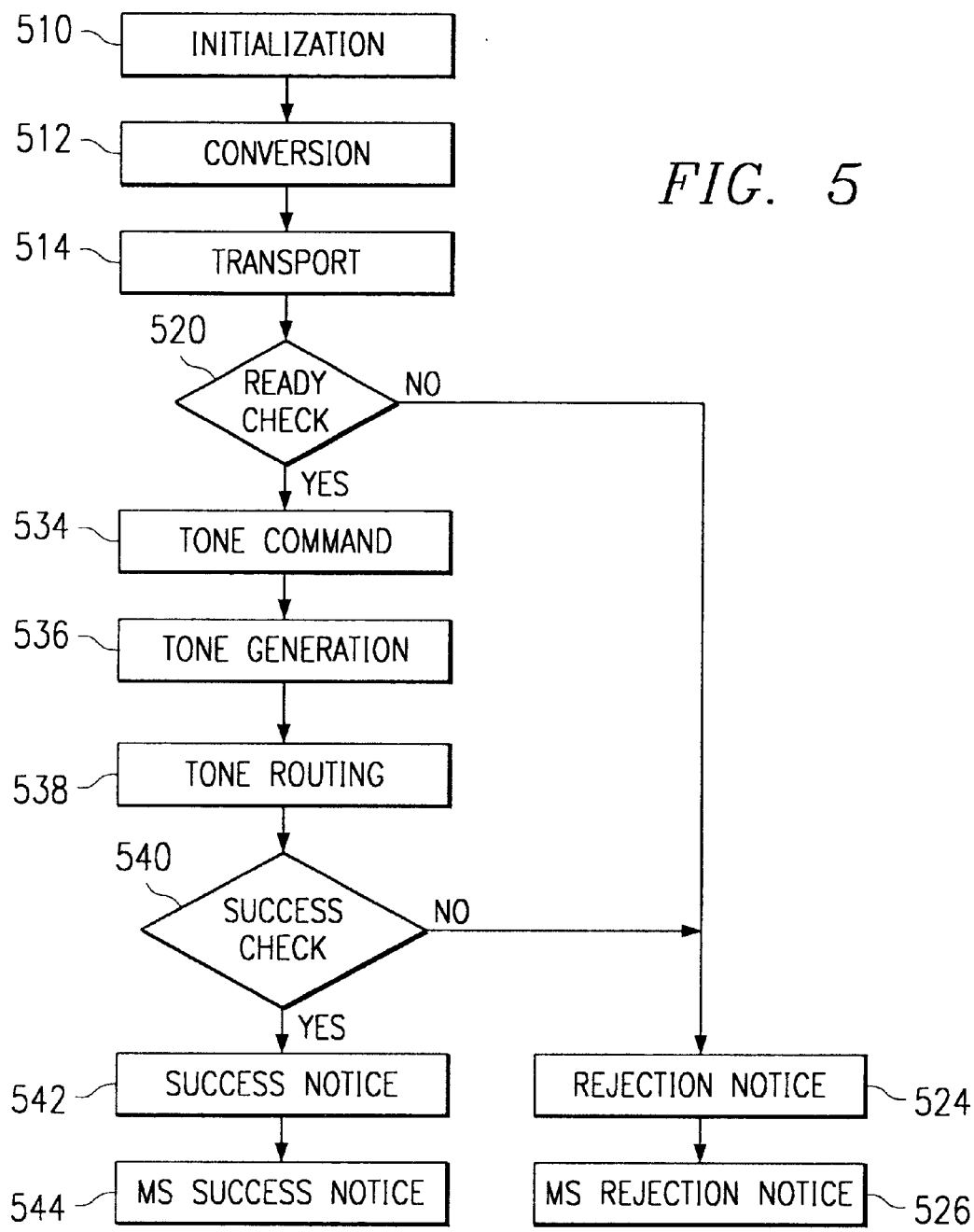
FIG. 5 depicts the flow of logic for communicating a DTMF from an MS to another MS across a GSM having an IP backbone.

FIG. 5 depicts the flow of logic for communicating a DTMF tone from a MS 220 to another MS 266 across an IP based backbone 270 in a GSM network. In an initialization, step 510, the MS 220 sends a start DTMF message to the LAM DMSCP 232 in the MSC 230. Next, through the conversion step the DMSCP 232 changes the start DTMF into a device control message, which is transported to a LAM, DMGP 262, which is in the GW 260, in step 514.

The DMGP 262 then checks to determine if the generating device (not shown) is available in a ready check, step 520. If the destination device is not ready or able to receive a DTMF tone, the DMGP 262 sends a rejection notice to the MSC 230 in a rejection notice, step 524. The DMSCP 232 then sends a "Start DTMF Reject" notice to the MS 220 to report the failure in a MS rejection notice, step 526. If the generating device can send a DTMF tone, then the DMGP 262 directs the tone generation.

Tone generation is implemented by first issuing a generate tone command in a tone command, step 534. The selected tone generating device then produces the tone in a tone generation, step 536. Next, the DMGP 262 routes the tone to the appropriate destination device in a tone routing, step 538.

Following the tone routing, step 538, the DMGP 262 detects whether or not the tone was sent in a success check, step 540. If the tone generation step fails, the DMGP 262 sends a rejection notice to the MSC 230 in a rejection notice, step 524. The DMSCP 232 then sends a "Start DTMF Reject" notice to the MS 220 to report the failure in a MS rejection notice, step 526. If the tone generation is successful, the DMGP 262 notifies the DMSCP 232 of the tone in a success notice, step 542. Then, the DMSCP 232 notifies the MS 220 of the tone generation by sending a "Start DTMF Acknowledge" message in a MS success notice, step 544.

While the invention has been described with preferred embodiments it should be understood that modifications will become apparent to those of ordinary skill in the art and that such modifications are intended to be included with the scope of the invention as defined by the following claims.

What is claimed is:

1. A system for sending Dual Tone Multi-Frequency (DTMF) tones through an Internet Protocol (IP) based transport network in a Global System for Mobile Communications (GSM) network, the system comprising:

a mobile station for generating and sending a Direct Transfer Application Part (DTAP) to a mobile switching center (MSC);

said MSC having a first logical application module (LAM), configured for receiving said DTAP message and converting the DTAP message into a device control message; and a gateway communicably coupled both to the MSC and the IP based transport network, said gateway having a second LAM configured for receiving said device control message, directing the generation of a DTMF tone towards a destination network, transmitting said DTMF tone; detecting whether said transmission was successful and sending a failure message to said first LAM if said transmission is unsuccessful.

2. The system of claim 1 wherein the first LAM passes the device control message to the second LAM through said IP based network.

3. The system of claim 1 wherein the second LAM is configured to send a failure message to the first LAM when the DTMF tone cannot be delivered.

4. The system of claim 1 wherein the second LAM is configured to determine if the DTMF tone cannot be delivered.

5. The system of claim 1 wherein the gateway is in communication with a Public Switched Telephone Network (PSTN).

6. The system of claim 1 wherein the gateway is in communication with a Mobile Station.

7. The system of claim 1 wherein the second LAM is configured to detect if a tone generation attempt was successful.

8. The system of claim 1 wherein the second LAM is configured to send a success notice to the first LAM.

9. A method of communicating Dual Tone Multi-Frequency (DTMF) tones to an Internet Protocol (IP) based network through a GSM network having an IP backbone, comprising the steps of:

a DTMF MSC Processor (DMSCP) receiving a Direct Transfer Application Part DTAP DTMF command from a GSM compatible mobile phone system;

said DMSCP converting the DTAP DTMF command into a device control message;

selecting a DTMF tone generation method compatible with a destination network responsive to instructions from a DTMF Media Gateway Processor (DMGP), generating a DTMF tone receivable by a destination network;

transmitting the DTMF tone to a destination device in the destination network upon direction from said DMGP;

detecting whether said transmission was successful; and sending a failure message to said DMGP if said transmission is unsuccessful.

10. The method of claim 9 wherein the destination network is a PSTN.

11. The method of claim 9 further comprising the step of determining if the DTMF tone was successfully transmitted.

12. The method of claim 9 further comprising the step of determining if the DTMF tone was received by the destination network.

13. The method of claim 9 wherein the step of instructing a tone generation device to generate a tone receivable by a destination network further comprises the step of generating a DTMF tone by placing tone generating data packets into a data stream.

14. The method of claim 9 wherein the destination network is an IP network.

15. The method of claim 9 wherein said receiving step is preceded by the step of a GSM compatible mobile phone system sending a DTAP command to a DTMF MSC processor (DMSCP) residing in a MSC.

16. The method of claim 9 wherein said step of converting the DTAP command into a device control message is followed by the step of transporting the device control message from the DMSCP to the DMGP.

17. The method of claim 16 wherein said transporting step is followed by the step of the DMGP determining if a destination is available to receive a DTMF tone.

18. The method of claim 17 wherein said determining step is followed by the step of the DMGP sending a rejection notice to the MSC, said rejection notice including the incapability of the destination device to receive a DTMF tone.

19. The method of claim 18 wherein said step of sending a rejection notice is followed by the step of reporting the incapability of the destination device to receive a DTMF tone to the MS by causing the DMSCP to send a "Start DTMF Reject" notice to the MS in a MS rejection notice.

20. The method of claim 18 wherein said determining step is followed by the step of the DMGP directing tone generation by causing a gateway to check for availability of a tone generator device in a destination network.

21. The method of claim 18 wherein said determining step is followed by the step of sending a rejection notice from the DMGP to the MSC if the tone generation is unsuccessful.

22. The method of claim 21 wherein said step of sending a rejection notice from the DMGP to the MSC if the tone generation is unsuccessful further comprises the step of transmitting a "Start DTMF Reject" notice from the DMSCP.

23. The method of claim 18 wherein said determining step is followed by the step of sending notification of successful tone transmission from the DMGP to the DMSCP if the tone generation is successful.

24. The method of claim 23 wherein said sending step further comprises the step of transmitting a "Start DTMF Acknowledgment" message from the DMSCP to the MS.

25. The method of claim 9 wherein said instructing step is followed by the step of the tone generating device producing a tone.

* * * * *